Dec. 26, 1961   E. M. DELORAINE ETAL   3,015,096
RADAR COUNTER-MEASURE RADIO REPEATER
Filed March 30, 1942                              2 Sheets-Sheet 1
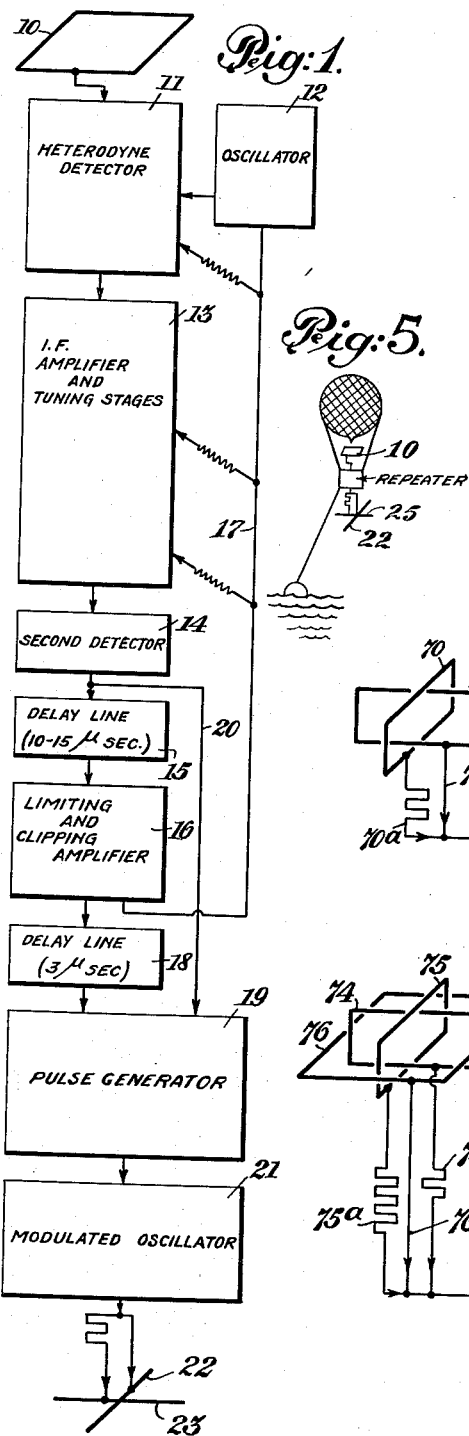
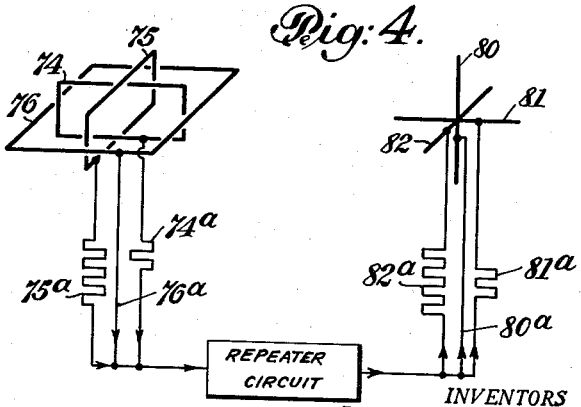
INVENTORS
EDMOND M. DELORAINE
HENRI G. BUSIGNIES
BY Paul R. Adams
ATTORNEY INVENTORS
EDMOND M. DELORAINE
HENRI G. BUSIGNIES
BY Paul R. Adams
ATTORNEY

United States Patent Office 3,015,096
Patented Dec. 26, 1961

3,015,096
RADAR COUNTER-MEASURE RADIO REPEATER
Edmond M. Deloraine, New York, and Henri G. Busignies, Forest Hills, N.Y., assignors to International Telephone and Telegraph Corporation, a corporation of Maryland
Filed Mar. 30, 1942, Ser. No. 436,846
7 Claims. (Cl. 343—18)

The present invention relates to systems for preventing the radio location of ships or aircraft and more particularly to such systems which send wave trains so timed and formed as to falsely simulate reflections from ships and the like.

It is an object of our invention to provide a false echo-producing apparatus which shall be light enough to be carried by a small balloon.

It is also an object of our invention to provide such an apparatus which shall be sufficiently easy to manufacture and sufficiently low in cost to render it practicable to launch a large number of equipments at a time when an enemy is attempting to obtain the location of a ship by radio ranging.

It is a further object to attain cheapness and facility of manufacture as to render it practicable to abandon each apparatus after use.

It is a further object to provide such an apparatus which shall yield an echo simulating a ship positioned at a point remote from the actual position of the apparatus.

It is also an object of our invention to provide such an echo-producing apparatus which shall accurately simulate the echo which would be produced by a warship. In particular it is an object to provide an echo-producing apparatus, the strength of whose echo shall be relatively independent of changes of orientation caused by rotation of the balloon carrying the apparatus.

It is a further object to provide such an apparatus, the strength of whose echo shall be relatively independent of variations in polarization of the received wave.

Other features and objects of our invention will appear from the following detailed description which is to be read in conjunction with the attached drawings in which FIG. 1 is a block diagram of an echo-producing apparatus embodying the invention;

FIGS. 3 and 4 illustrate alternative antenna arrangements capable of use in the apparatus of FIGS. 1 and 2;

FIG. 5 shows the apparatus of FIG. 1 mounted on a small balloon.

Figure 2:
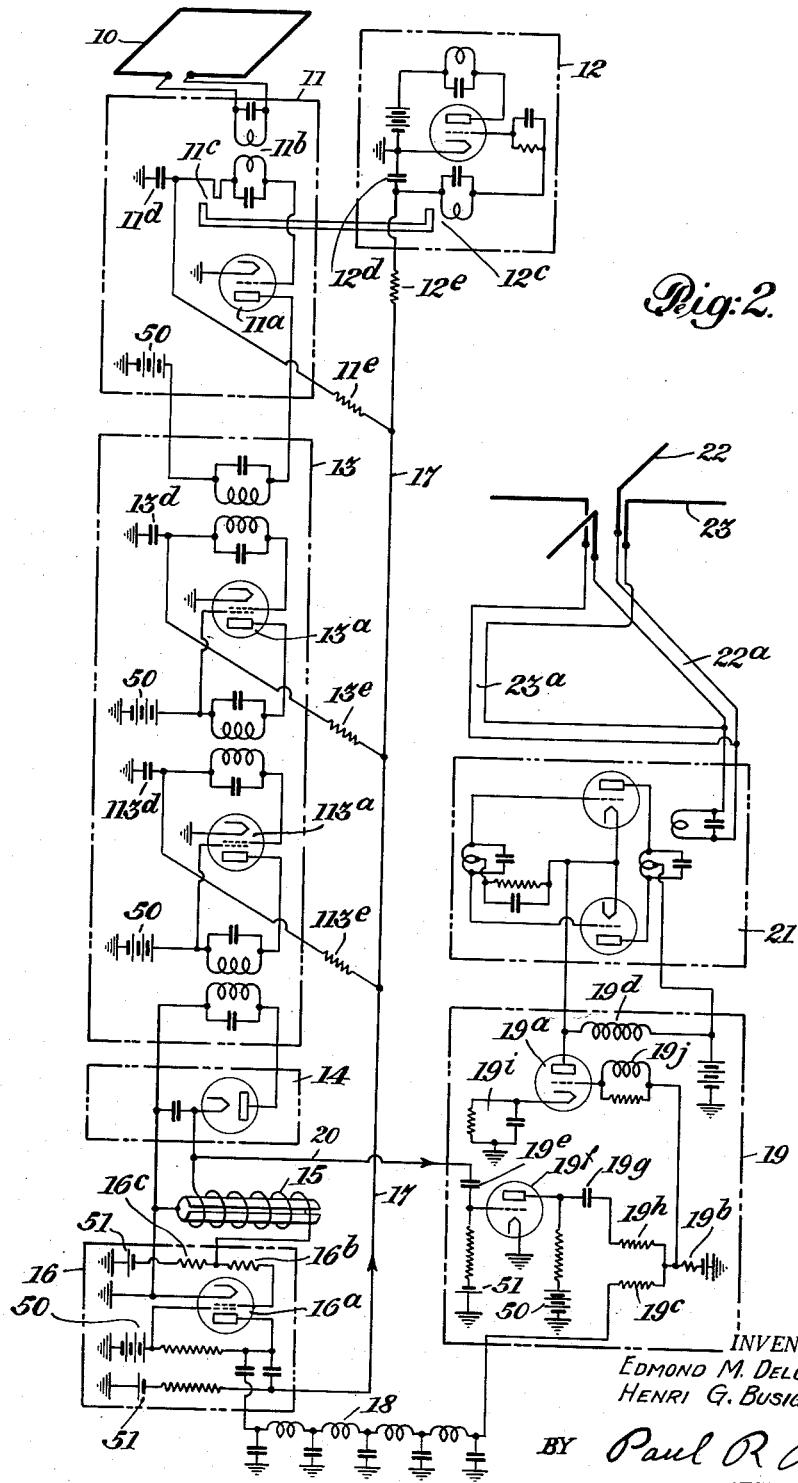
FIG. 2 is a more detailed circuit diagram of the apparatus represented in FIG. 1.

The apparatus designated in FIGS. 1 and 2 is intended to be constructed in the form of a small unit weighing a very few pounds and capable of being carried on a small cellophane balloon of the type used in meteorological tests.

In general the function to be performed by this apparatus is as follows: First, to receive on a suitable receiving antenna a signal presumably in the form of a brief wave train of ultra-short waves; second, to reradiate from a separate transmitting antenna a similar train with increased power after a brief delay. The increased power of re-radiation serves to compensate for the small pickup area by the receiving antenna and the ratio of power increase should be so adjusted that the total power radiated in response to an arriving signal of given field strength is approximately equal to the total power which would be reflected from a warship of the type being protected in response to the same received field strength. The height of the apparatus above the water may be regulated by means of a small sea anchor or float suspended from the balloon and resting on the surface of the water. Preferably, such height should be approximately equal to the height of the portions of a battleship which first begin to produce a substantial reflection.

Referring more particularly to FIG. 1, 10 is a receiving antenna in the form of a horizontal loop. This loop supplies energy to a demodulator 11 of the so-called "mixer" type which also receives energy from an oscillator 12. The intermediate frequency energy produced in the demodulator 11 from the beating of the wave derived from the loop of the oscillator 12 is transmitted through intermediate frequency section 13 containing a plurality of intermediate frequency amplifier stages with tuning equipment of the band selection type. The intermediate frequency should be relatively high and the band selection equipment should be adapted to pass a relatively broad band so that the overall selectivity of the system will admit approximately plus or minus 1% of the carrier frequency, or even more. From the intermediate frequency section 13 energy is delivered to a section detector 14 after which the detector envelope is passed through a delay line 15 adjusted to give a delay of about 10 to 15 microseconds. This delay line may be adjustable or fixed; if it is fixed, it is preferable that the delay lines of different devices should have different delays so that the enemy cannot predict from experience the value of the delay which is probably being used in any given apparatus.

From the delay line 15 the wave is passed through an amplifier 16 which is preferably arranged to produce a limiting and clipping action (i.e., to suppress the upper and lower extreme portions of the wave to it by passing only the central portions thereof). If it is considered important to make the output or simulated echo fairly accurate, proportionate to the amplitude of the received wave, the amplifier 16 should not have a limiting action or, at least, should be adjusted so that such limiting action should not come into play with the signal strengths ordinarily expected. The clipping feature of the amplifier (which is ordinarily obtained by biasing it slightly below cut-off) may be retained even in such case in order to improve and sharpen the wave form which may have become rounded in transmission through the line 15.

The output from the amplifier 16 is divided into two parts, one portion being transmitted over a blocking channel 17 to disable the intermediate frequency section 13, the heterodyne detector 11, and the oscillator 12, while the other portion of the energy from the amplifier 16 is transmitted through a further delay line 18 to the impulse generator 19.

The impulse generator 19 is of a type disclosed in the copending application of Emile Labin, Serial No. 433,762, filed March 7, 1942, now Patent No. 2,419,566. As will be briefly described in connection with FIG. 2, this impulse is adapted to produce very high voltage impulses of exceedingly brief duration by suddenly interrupting the current in an inductance coil. The energy delivered to the impulse generator 19 from the delay line 18 serves to initiate the abrupt cutting off of the current thus instantly causing the very high voltage brief impulse. Before such current-cutting action can be effected, however, a preparatory impulse must be delivered to initiate the flow of current through the inductance and such preparatory impulse must be received at least several microseconds before the control impulse from line 18. For this purpose an extra channel 20 is provided, as shown, to take a portion of the energy from the output of second detector 14 ahead of the delay line 15 and to transmit such energy directly to the impulse generator 19. If the delay in line 15 is 10 microseconds and the delay in line 18 is 3 microseconds, it will be seen that the preparatory control signal over channel 20 will arrive a little more than 13 microseconds ahead of the current terminating signal from delay line 18.

The high voltage brief impulses produced by the impulse generator 19 in response to the signals from delay line 18 are transmitted to modulated oscillator 21 where they are used in place of B supply thus serving not only to modulate the oscillator 21 but also to furnish the actual plate voltage for operation thereof. If the received signals are in the form of a brief train of ultra-high frequency waves (e.g., two or three microseconds wave train of waves in several hundred megacycles), the output from the modulated oscillator 21 will similarly be a two or three microseconds wave train of waves.

The modulated oscillator 21 is preferably arranged to be manually adjustable, and is tuned to approximately the frequency of the enemy's transmission before the apparatus is released, the oscillator 12 and the radio frequency stages of the detector 11 being tuned at the same time so as to efficiently receive the enemy's transmission. The output of modulated oscillator 21 is transmitted to a turnstile antenna comprising two crossed dipoles 22 and 23, the feed lines to the two dipoles being of unequal length so that these will be fed approximately 90° out of phase. By this means a rotating field is produced having substantially equal field strength in all directions.

Referring now to the more detailed showing of FIG. 2, it will be seen that the heterodyne detector 11 is of generally conventional construction except for connections to the grid of the tube 11a. This grid connection is arranged to take three signals in series, the first being the incoming signal from loop 10 which is applied over the secondary of doubly tuned transformer 11b, the second being the signal from oscillator 12 which is applied to a very low impedance inductive coupling 11c, and the third being a low frequency disabling signal applied to condenser 11d through a resistor 11e from blocking channel 17 as hereafter explained.

The oscillator 12 is an ordinary tuned plate, tuned grid oscillator but its grid is arranged to obtain bias through resistor 12e from the channel 17, being by-passed to ground through condenser 12d as shown. The output of this oscillator is taken by a specially tuned inductive coupling 12c, the secondary of which together with the primary of inductive coupling 11c, forms a low impedance link coupling arrangement.

The intermediate frequency section 13 is also of generally conventional type having all its transformers doubly tuned for wide-band selection characteristics. The tubes employed 13a and 113a are shown as tetrodes but may be pentodes or beam power tubes. The control grids of these tubes are by-passed to ground by condensers 13d and 113d and are connected to receive their C bias via resistors 13e and 113e from channel 17.

It will thus be seen that the detector 11, the oscillator 12, and both stages of the intermediate frequency section 13 are adapted to be blocked by the application of a strongly negative potential on channel 17. In order that no troublesome regeneration or unintended coupling shall be produced through the common channel 17, the resistors 11e, 12e, 13e and 113e should be made comparatively high in comparison with the reactance by the radio frequencies concerned of condensers 11d, 12d, 13d and 113d. In fact, the time constants defined by 11e and 11d, by 12e and 12d, by 13d and 13e, and by 113d and 113e should be made as large as possible to minimize coupling difficulties. The upper limit of such time constants is set by the expected recurrence frequency of the wave trains to be received and relayed. If, for example, the equipment is to operate satisfactorily in relaying wave trains having a recurrence frequency of 5000 trains per second, each of the time constants above referred to should be short in comparison with 200 microseconds, in order that the negative block potential applied to disable the stages 11, 12 and 13 immediately after a wave train shall be substantially wholly dissipated at the time the next wave train arrives. In practice, it may be assumed that the enemy's apparatus will probably be designed with a recurrence frequency sufficiently low to enable him to perform radio ranging distances of 15,000 meters or more, thus necessitating an interval of 100 microseconds or more between wave trains. Upon this assumption the time constants of 11d, 11e, etc. may be made 30 microseconds each. With such time constants it is very easy to provide an adequate amount of decoupling between the different grids which receive their bias and their negative blocking pulses over channel 17.

The second detector 14 may be an ordinary diode detector as shown and the delay line 15 may be a concentrated line produced by coiling a wire around a slotted copper tube so as to provide comparatively large amounts of distributed inductance and capacitance per unit length. Amplifier 16 may be an ordinary amplifier using triodes, tetrodes or pentodes. For convenience, amplifier 16 is illustrated as employing a tetrode 16a which may be assumed to be either an ordinary tetrode or a beam power type of tetrode which attains the advantage of suppressor grid without the provision of such a grid.

A resistor 16b in the grid-lead of such amplifier will serve to produce a limiting effect by substantially preventing an increase of input voltage after the point of grid current is reached.

A grid bias supply resistor 16c enables the grid to be biased from a C battery 51 as shown and such C bias is preferably sufficiently negative to bring the tube slightly below cut-off thus effecting a clipping action. As previously mentioned, the limiting resistor 16b may be omitted but preferably such a resistor is provided and the circuit is designed so that such resistor will not cause any limiting until the incoming signal is at such level as to overload the equipment. Thus, in a normal expectant operating range no limiting action will occur and the output will be roughly proportionate to the input except for the slight volume expanding action due to the clipping effect of the negative bias on the grid of 16a.

Delay line 18 is shown as a conventional artificial line although it may be of the same type as line 15. The output of this delay line 18 (which will be a brief negative pulse) is transmitted to the grid of tube 19a in the impulse generator 19, being applied to this grid through a voltage divider consisting of a fairly low resistor 19b and a higher decoupling resistor 19c. If, at this time, the tube 19a is conductive and is feeding a large current through inductance coil 19d the arrival of such negative pulse may, under certain conditions, initiate an action which results in quickly terminating the flow of current through tube 19a, thus causing conductive coil 19d to produce a short, high voltage surge. In order to understand more fully how this occurs it is convenient first to consider the operation of impulse generator 19 starting with the instant when the incoming wave train after detection in second detector 14 was applied to the delay line 15.

At the same time that the output from detector 14 is delivered to line 15 a portion of the energy thereof is delivered through coupling condenser 19e to the grid of an inverting and amplifying tube 19f, the output of which is in turn delivered through coupling condenser 19g to a voltage divider comprising the decoupling resistor 19h and the comparatively low resistor 19b. The pulse (which is positive after inversion in 19f) will bring the grid of tube 19a above the cut-off potential in spite of the negative bias applied to this grid from the C battery through resistor 19b (and the positive bias which may be, at this time, existing on the cathode by reason of a charge stored in the condenser of R-C circuit 19i, as hereafter explained). The space path of tube 19a therefore commences to pass current which flows through inductance coil 19d as well as through time constant circuit 19i (the latter being preferably of low impedance).

By inductive coupling, grid coil 19j produces a positive surge on the grid which still further increases the conductivity of the space path. By such cumulative action the grid becomes almost instantly so positive that the space path has a negligible impedance compared to inductance coil 19d and thereafter the current rise is approximately linear, being limited almost wholly by the inductance of this coil. After the current has risen linear for about 10 to 15 microseconds the R-C circuit 19i will build up a positive charge. Preferably this circuit should be so proportioned that the charge built up would suddenly initiate the termination of the current in 19 or 25 microseconds. Thus, after 13 to 18 microseconds the cathode potential is near enough to the grid potential so that a reasonably moderate negative pulse of the grid will suffice to produce a substantial decrease in current.

When the pulse has traveled through delay line 15, amplifier 16 and further delay line 18, it is finally applied over voltage divider 19h—19b to the grid of tube 19a, as previously mentioned. At this time the grid is still strongly positive but the cathode has become sufficiently positive so that a reasonably moderate pulse can produce a substantial change in output current of the tube. The pulse arriving from line 18 has such an effect that it causes the current through the space path of tube 19a in series with inductance coil 19d to slightly decrease (or at least to somewhat diminish in rate of decrease). Such a change, in turn, tends to make the grid of tube 19a more negative (or at least less strongly positive) through the transformer action and windings of 19d and 19j. This, in turn, further decreases the current which action renders the grid still more negative. Thus, in a very short interval of time, the current through the tube 19a is completely cut off producing a very high voltage surge across the winding 19d as well as a somewhat lower but still very substantial negative surge on its own grid.

After such abrupt cut-off of current the tube 19a remains below cut-off for some time since the positive charge applied to the filament by R-C circuit 19i requires some time to be fully dissipated. Preferably, the time constant of 19i should be short enough so that most of its charge leaks off in an interval corresponding to the shortest interval between wave trains in the signals which are expected from the enemy. In order that the tube shall not spontaneously re-start itself upon the dissipation of the charge from R-C circuit 19i, the negative C bias applied through resistor 19b is preferably sufficient to maintain the tube slightly below cut-off.

The surge of voltage from inductance coil 19d is applied across the cathode and anode of push-pull oscillator 21 thus serving as the anode supply for such oscillator. The oscillator 21 itself is a tuned grid, tuned plate oscillator of push-pull type whose construction is in itself well-known. The output in such oscillator is transmitted across the dipoles 22 and 23 over lines 22a and 23a, respectively, the length of these lines differing by 90 electrical degrees so as to produce quadrature excitation of the turnstile antenna 22—23.

Referring now more particularly to FIGS. 3 and 4 respectively, these show alternative antenna arrangements. The antenna arrangements of FIGS. 1 and 2 were particularly adapted for horizontal polarization, being arranged to give essentially circular radiation patterns whereby no great change in sensitivity is produced by rotation around a vertical axis.

The antenna arrangements shown in FIG. 3, on the other hand, are adapted to produce similar circular radiation arrangements for vertical polarization. As shown, the receiving antenna of FIG. 3 comprises a pair of cross loops 70 and 71 connected to the repeater circuit by different length lines 70a and 71a while the transmitting antenna is a single vertical dipole 72.

The arrangement of FIG. 4 is particularly useful in cases where polarization of the enemy's transmission is not known or is variable by reason of an intentional change or for some other reason. In this arrangement three mutually perpendicular loops 74, 75, 76 are used for the receiving antenna, being connected through the repeater circuit by lines 74a, 75a and 76a. The line 74a is 60 electrical degrees longer than the line 76a, and the line 75a is 60 electrical degrees longer than the line 74a. The transmitting antenna of FIG. 5 comprises three mutually perpendicular dipoles 80, 81, 82 fed over variable length lines 80a, 81a and 82a. The variation in length between lines 80a and line 81a is 60 electrical degrees and similarly the variation in length between line 81a and line 82a is 60 electrical degrees whereby a rotating wave of universal polarization is emitted in such fashion as to give substantially the same energy in all horizontal directions and for all polarizations.

It will be noted that in every example illustrated the receiving antennae are of loop form and the transmitting antennae are of dipole form. This has the very great advantage of minimizing coupling between the transmitting and receiving antennae for a given degree of balance and remoteness. Ordinarily the two antennae cannot be very remote in a small compact unit such as one capable of being carried by a balloon. It is possible to dispose the antenna in balanced fashion so as not to interact but such balance cannot be perfect and is moreover readily disturbed by motion of the surface of the balloon or by varying proximity to the ground. Moreover, the problem of exactly balancing the two antennae so as not to interact is a difficult one and is further complicated when the frequency of operation is intended to be quickly adjusted at the time of putting the apparatus into use.

By making one antenna of the loop type whose nearby field is primarily magnetic while the other antenna is of the dipole type whose nearby field is mostly electro-static, interaction between the two antennae is very greatly reduced even without the need for arranging the antennae in any particular relative position. If, in addition, the antennae are arranged in such relative positions as to further reduce interaction the amount of pick-up of transmitted signals of the receiving antenna can be made very small.

It should be understood that although we have shown the loop antenna as used for reception while the dipole antennae are used for transmission, these relationships may be reversed so as to use the dipole antenna for reception and the loop for transmission. Preferably, however, the antenna used for reception should be of the opposite kind from the type used for transmission in respect of their ratio of electro-static to electro-magnetic influence. Thus antennae primarily having electro-static influence should be used for one array (i.e. receiving or transmitting) while antennae of the opposite type should be used for the other array.

Although it is preferred in most cases to make the output proportional to the input within the range of intensities expected to be encountered so that the limiting effect of resistor 16b does not come into play until the voltage is higher than that normally expected, it may in some cases be desirable to modify the response so that the variation of output is less rapid than variation of input. This may be accomplished by the use of a moderate degree of automatic volume control according to conventional practice.

It should, furthermore, be noted that although the preferred arrangement makes use of the principle of blocking for preventing the circulation of energy which would otherwise tend to cause singing, a similar effect can be attained by the use of the well-known principle of conjugacy, either used alone in place of the blocking arrangement shown or together therewith.

Although in the preferred form above illustrated and described, separate antenna are used for transmitting and receiving, the invention can also be practiced with a single antenna serving both for receiving and transmitting, the principle of conjugacy and/or blocking being relied upon to avoid singing. The preferred embodiment illustrated wherein separate antennae are positioned so as to minimize the coupling therebetween is believed to be the simplest arrangement for freedom from interference without requiring undue accuracy in adjustment.

Although the preferred form of buoyant craft for supporting the repeater equipment in the embodiment described is a small balloon as shown in FIGURE 5 whose height above the sea is determined by aid of a float or sea anchor, it is clear that the float or sea anchor may be eliminated. In such case, the balloon should be fairly accurately balanced in buoyancy so as to come to equilibrium at a moderate height substantially less than a mile above the water surface. It is within the scope of the invention to employ other types of buoyant craft, such as for example, rafts or electrically propelled surface vessels floating upon the surface of the water rather than in the air.

Although certain embodiments of the invention have been shown and described for purposes of illustration, it will be understood that adaptations, modifications and variations thereof, occurring to one skilled in the art, may be made without departing from the scope of the invention as defined in the appended claims.

What we claim is:

1. Apparatus for repeating a received brief train of radio waves, which comprises receiving antenna means adapted to pick up a small energy from said train of waves, signal receiving means coupled to said antenna means for amplifying energy picked up thereby, an inductance coil, current passing means for passing current therethrough in response to a preparatory signal, delay means connected to said receiving means for delivering energy received therefrom with a substantial delay, means for abruptly terminating the flow of current through said coil in response to the delivery of energy from said delay means whereby a high voltage surge is produced, and means for converting the energy of said high voltage surge into a radiated wave train.

2. Apparatus for simulating the reflection characteristics of an extensive conductive body with respect to an arriving succession of brief trains of radio waves of predetermined frequency, which comprises receiving antenna means of a type giving substantially constant reception for all planes of polarization adapted to pick up small energy from such trains of waves, amplifying repeater means coupled to said antenna for radiating one brief wave train of said frequency substantially of a strength predetermined in accordance with the reflection characteristics of the conductive body in response to the receipt of energy of each wave train, whereby there is produced a simulated echo having a strength independent of the polarization of waves received by the apparatus in the form of a succession of wave trains synchronized with respect to the arriving succession of wave trains, and a small buoyant craft spaced from said reflecting body supporting said receiving antenna means and said repeater means.

3. Apparatus for simulating the reflection characteristics of an extensive conductive body with respect to an arriving succession of brief trains of radio waves of predetermined frequency, which comprises receiving antenna means of a type giving substantially constant reception for all planes of polarization adapted to pick up a small energy from such trains of waves, amplifying repeater means coupled to said antenna for radiating one brief wave train of said frequency in response to receipt of the energy of each train, said amplifier repeater means being of a type radiating waves of a generally circular polarization, whereby there is produced and radiated a succession of wave trains synchronized with respect to the arriving succession of wave trains simulating echoes having a strength independent of the polarization of waves received by the apparatus.

4. In a system for aiding in the protection of a body possessing known radiant energy reflection characteristics, from detection by reflection of transmitted radiant energy waves, the method of stimulating the reflection effects of said body at a point remote from said body comprising directly receiving the transmitted radiant energy waves at a position remote from said body, amplifying the received waves to a value dependent upon the reflected wave amplitudes determined by the reflection characteristics of said body, and retransmitting the received amplified waves.

5. Apparatus for simulating the reflection characteristics of an extensive conductive body with respect to an arriving succession of brief trains of radio waves of predetermined frequency, which comprises receiving antenna means adapted to pick up a small energy from such trains of waves, signal receiving means coupled to said antenna means for amplifying energy picked up thereby, transmitting means for amplifying and radiating energy, delay means having an input connected to said receiving means and an output connected to said transmitting means for delivering energy from said receiving means to said transmitting means with a substantial predetermined delay, means for disabling said receiving means in response to the arrival of energy at the output of said delay means, said means for disabling having such time constants as to require an appreciable time to effect complete disablement, said transmitting means comprising an additional delay means to delay the commencement of radiation until after disablement of the receiving means is complete, and a small buoyant balloon supporting said apparatus.

6. Apparatus for simulating the reflection characteristics of an extensive conductive body with respect to an arriving succession of brief trains of radio waves of predetermined frequency, which comprises receiving antenna means adapted to pick up a small energy from such trains of waves, signal receiving means coupled to said antenna means for amplifying energy picked up thereby, transmitting means for amplifying and radiating energy, delay means having an input connected to said receiving means and an output connected to said transmitting means for delivering energy from said receiving means to said transmitting means with a substantial predetermined delay, means for disabling said receiving means in response to the arrival of energy at the output of said delay means, said transmitting means comprising an inductance coil, current passing means for passing current therethrough in response to a preparatory signal, means connected to the output of said delay means for abruptly terminating the flow of current therethrough in response to the delivery of energy from said delay means whereby a high voltage surge is produced, means for converting the energy of said high voltage surge into a radiated wave train, a transmission channel connected to deliver energy from a point ahead of said delay means to said current passing means to serve as said preparatory signal, and a small buoyant balloon supporting said apparatus.

7. Apparatus for simulating the reflection characteristics of an extensive conductive body with respect to an arriving succession of brief trains of radio waves of predetermined frequency, which comprises receiving antenna means adapted to pick up a small energy from such trains of waves, signal receiving means coupled to said antenna means for amplifying energy picked up thereby, transmitting means for amplifying and radiating energy, delay means having an input connected to said receiving means and an output connected to said transmitting means for delivering energy from said receiving means to said transmitting means with a substantial predetermined delay, means for disabling said receiving means in response to the arrival of energy at the output of said delay means, said transmitting means comprising an inductance coil, current passing means for passing current therethrough in response to a preparatory signal, an additional delay device, means connected via said additional delay device to the output of said delay means for abruptly terminating the flow of current therethrough in response to the delivery of energy from said delay means whereby a high voltage surge is produced and means for connecting the energy of said high voltage surge into a radiated train wave, and a small buoyant balloon supporting said apparatus.

References Cited in the file of this patent

UNITED STATES PATENTS

| | | |
|---|---|---|
| 1,881,395 | Aull | Oct. 4, 1932 |
| 1,993,467 | Von Ardenne | Mar. 5, 1935 |
| 1,994,288 | Scheibell | Mar. 12, 1935 |
| 2,063,025 | Blumlein | Dec. 8, 1936 |
| 2,127,572 | Peterson | Aug. 23, 1938 |
| 2,134,716 | Gunn | Nov. 1, 1938 |
| 2,273,161 | Usselman | Feb. 17, 1942 |
| 2,276,994 | Milinowski | Mar. 17, 1942 |
| 2,453,970 | Charrier | Nov. 16, 1948 |
| 2,582,971 | Dunmore | Jan. 22, 1952 |

FOREIGN PATENTS

| | | |
|---|---|---|
| 367,687 | Great Britain | Feb. 25, 1942 |

OTHER REFERENCES

Bureau of Standard's Scientific Paper No. 354, Dec. 11, 1919, page 455.